US012287898B2

(12) United States Patent
Jiang et al.

(10) Patent No.: US 12,287,898 B2
(45) Date of Patent: Apr. 29, 2025

(54) QUERY-BASED DATABASE REDACTION

(71) Applicant: SNOWFLAKE INC., Bozeman, MT (US)

(72) Inventors: Boxin Jiang, Sunnyvale, CA (US); Qiming Jiang, Redmond, WA (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 18/155,293

(22) Filed: Jan. 17, 2023

(65) Prior Publication Data

US 2023/0153455 A1 May 18, 2023

Related U.S. Application Data

(63) Continuation of application No. 17/519,729, filed on Nov. 5, 2021, now Pat. No. 11,580,251.

(51) Int. Cl.
G06F 16/2455 (2019.01)
G06F 21/62 (2013.01)

(52) U.S. Cl.
CPC .... *G06F 21/6227* (2013.01); *G06F 16/24564* (2019.01)

(58) Field of Classification Search
CPC ................ G06F 21/6227; G06F 16/24564
USPC ........................................ 726/30
See application file for complete search history.

(56) References Cited

U.S. PATENT DOCUMENTS

| 7,188,102 | B1 | 3/2007 | Gollapudi et al. |
| 7,748,027 | B2* | 6/2010 | Patrick ............... G06F 21/6209 |
| | | | 709/227 |
| 11,024,299 | B1* | 6/2021 | Drake .................. G10L 15/197 |
| 11,055,289 | B2 | 7/2021 | Bastawala et al. |
| 11,144,669 | B1* | 10/2021 | Rao ...................... G06F 16/3346 |
| 2005/0144176 | A1 | 6/2005 | Lei et al. |
| 2013/0144901 | A1* | 6/2013 | Ho ........................ G06F 16/248 |
| | | | 707/769 |
| 2014/0012833 | A1 | 9/2014 | Humprecht |
| 2018/0096102 | A1* | 4/2018 | Akinmeji ............... G16H 10/60 |
| 2018/0218030 | A1 | 8/2018 | Wong et al. |
| 2019/0130123 | A1* | 5/2019 | Ben-Yair ............... G06F 21/606 |

OTHER PUBLICATIONS

International Search Report and Written Opinion dated Feb. 22, 2023, from International Patent Application No. PCT/US2022/047664 filed Oct. 25, 2022; 7 pages.

(Continued)

*Primary Examiner* — Joshua Bullock
(74) *Attorney, Agent, or Firm* — Womble Bond Dickinson (US) LLP

(57) ABSTRACT

Embodiments of the present disclosure describe systems, methods, and computer program products for redacting sensitive data within a database. An example method can include receiving a data query referencing unredacted data of a database, wherein the data query that is received comprises a value identifying a type of sensitive data to be redacted from the unredacted data, responsive to the data query, executing, by a processing device, a redaction operation to identify sensitive data that matches the type within the unredacted data of the database, and returning a redacted data set in which the sensitive data that matches the type is replaced or removed to the data query.

20 Claims, 9 Drawing Sheets

(56) References Cited

OTHER PUBLICATIONS

International Preliminary Report on Patentability in corresponding PCT/US2022/047664 dated May 2, 2024 (4 pages).
Fuyuncat, Oracle Row Shipping, downloaded from http://www.hellodba.com/reader.php?ID=25, Dec. 25, 2009 (6 pages).
Hopkins, T., "Virtual Columns and Row Shipping", downloaded from http://www.timothyhopkins.net/2009/10/virtual-columns-and-row-shipping, Oct. 5, 2009 (4 pages).
Hopkins, T., Attachment (to "Virtual Columns and Row Shipping"), dowloaded from http://timothyhopkins.net/wp-content/uploads/2009/10/rowship.txt, believed to be published on or before Oct. 5, 2009 (4 pages).
Modrakovic, M., Wide Table Select (Row Shipping), downloaded from https://oraclue.wordpress.com/2009/07/13/wide-table-select-row-shipping, Jul. 13, 2009 (7 pages).

\* cited by examiner

410 —

```
{
    "containsPII":[TRUE|FALSE],
    "maskedText": <text>,
    "piiEntities": [
        {
            "text": <pii_text>,
            "type": ["NAME"|"LOCATION"|...],
            "offset": <text_start_pos>,
            "length": <text_length>,
            "score": <is_pii_possibility>
        },
        ...
    ]
}
```

```
{
    "containsPII": TRUE,
    "maskedText": "My phone number is <PHONE>.",
    "piiEntities": [
        {
            "text": "555-555-0199",
            "type": "PHONE",
            "offset": 19,
            "length": 12,
            "score": 0.8
        }
    ]
}
```

```
410B
{
    "containsPII": FALSE,
    "maskedText": "Historical attendance record across all schools.",
    "piiEntities": []
}
```

FIG. 4C

```
410C    {
            "containsPII": TRUE,
            "maskedText": "<Name> email address is <Email>.",
            "piiEntities": [
                {                                           420C1
                    "text": "Janet's",
                    "type": "Name",
                    "offset": 0,
                    "length": 7,
                    "score": 0.724
                },                                          420C2
                {
                    "text": "janet@foo.com",
                    "type": "Email",
                    "offset": 25,
                    "length": 13,
                    "score": 0.95
                }
            ]
        }
```

FIG. 4D

QUERY-BASED DATABASE REDACTION

CROSS REFERENCE TO RELATED APPLICATIONS

This application is a continuation of U.S. patent application Ser. No. 17/519,729, filed Nov. 5, 2021, the entire contents of which are incorporated by reference herein.

TECHNICAL FIELD

The present disclosure relates to database operations and, in particular, to redacting sensitive information within database data.

BACKGROUND

Databases are widely used for data storage and access in computing applications. Databases may include one or more tables that include or reference data that can be joined, read, modified, or deleted using queries. Databases can store small or extremely large sets of data within one or more tables. This data can be accessed by various users in an organization or even be used to service public users, such as via a website or an application program interface (API).

Personally identifiable information (PII) includes any information that permits the identity of an individual to be directly or indirectly inferred, including any information that is linked or linkable to that individual. Protected health information (PHI) includes individually identifiable information relating to the past, present, or future health status of an individual.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

FIGS. 4A to 4D are examples of code structures that may be utilized for return values of a redaction operation, in accordance with some embodiments of the present disclosure.

DETAILED DESCRIPTION

Figure 1:
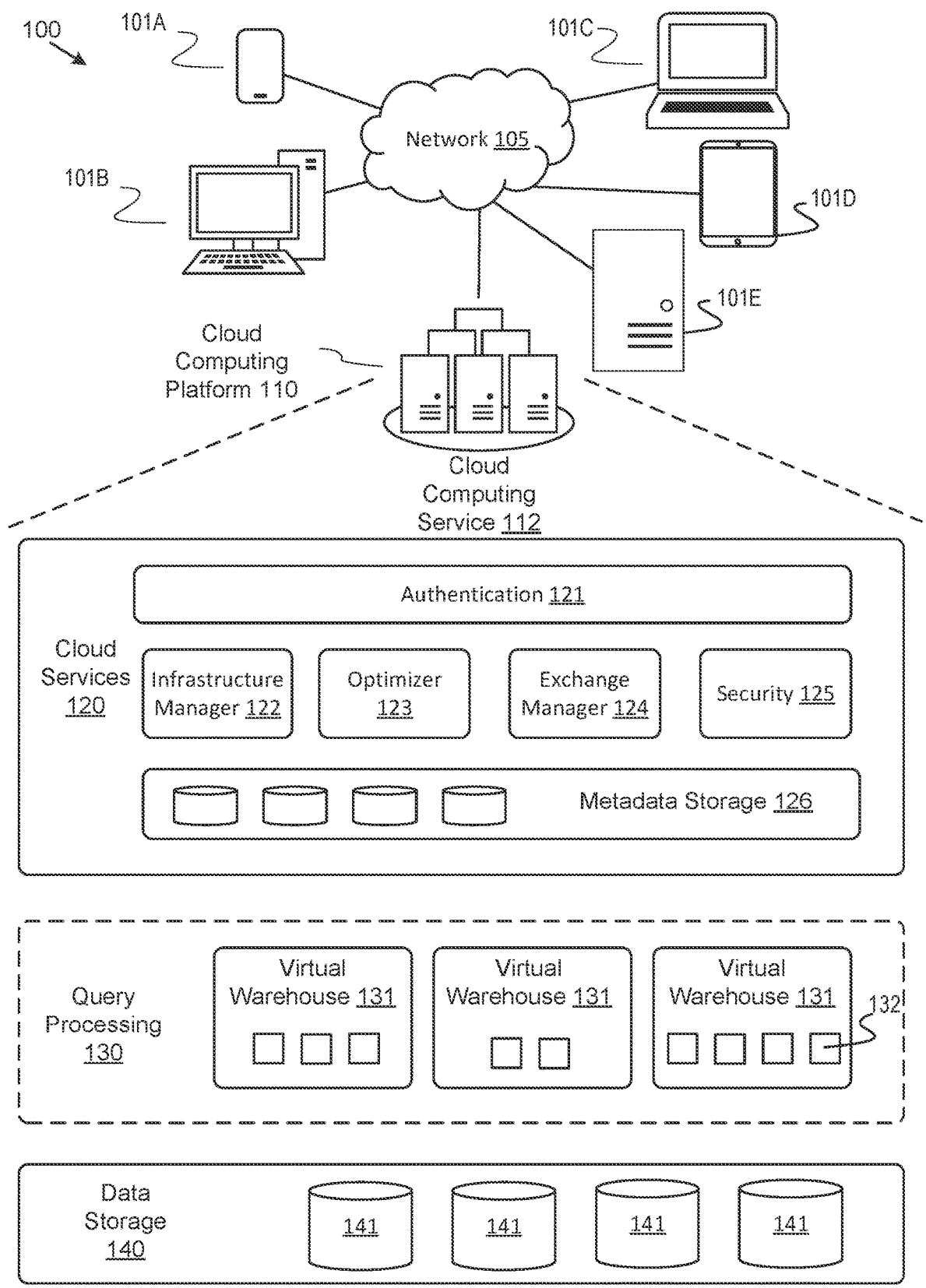
FIG. 1 is a block diagram depicting an example computing environment in which the methods disclosed herein may be implemented.

In the systems and methods described herein, a data storage system utilizes a SQL (Structured Query Language)-based relational database. However, these systems and methods are applicable to any type of data storage architecture and using any language to store and retrieve data within the data storage. The systems and methods described herein provide a mechanism for performing an analysis of data held within a database to redact sensitive data. In some embodiments, the redaction may be generated by a SQL user-defined function (UDF) exposed by the database.

Databases increasingly contain large amounts of data created and/or stored from many sources. In many cases, the data in the databases may contain sensitive data in the form of personal and/or sensitive information, which may need to be protected. As used herein, "sensitive data" refers to data the exposure of which is desired to be controlled and/or limited. For example, sensitive data may refer to PII and/or PHI, but the embodiments of the present disclosure are not limited thereto. In some embodiments, sensitive data includes data of a secret nature, such as national secrets, trade secrets, network credentials/secrets, or the like. As used herein, the term "and/or" includes any and all combinations of one or more of the associated listed items.

Some embodiments herein describe systems and methods that utilize the architecture of a database to provide the ability to perform redaction on sensitive data within a database. As used herein, "redaction" refers to the act of removing or masking (e.g., by replacing with alternate content) data. In some embodiments, the redaction may be performed on data within the database, without exposing the data being redacted outside the database (e.g., the redaction may be performed in situ within the database). In some embodiments, database functionality, such as a UDF, may be utilized to automatically recognize the sensitive data within the database and access the redaction. In some embodiments, the recognition of the sensitive data may be provided by a machine learning operation performed utilizing a machine learning model that is configured to recognize sensitive data within a data field.

Some conventional mechanisms that perform redaction on sensitive data, such as sensitive data within a database, may first export the data before performing the redaction. This export may remove the sensitive data from the database, which can expose the sensitive data to compromise and/or create a situation in which additional security is necessary. The embodiments described herein may reduce and/or minimize the data exchange utilized to perform redaction on sensitive data. For example, in some embodiments, the operations that perform the redaction of the sensitive data may be co-located with the sensitive data such that the sensitive data does not have to be exported from the database to be redacted. As a result, the sensitive data may not have to leave the boundary of the database as part of the redaction process. Moreover, performing the redaction by procedures that are co-located with the sensitive data may have increased performance, as unnecessary exports and/or additional processing are not required. In some embodiments, performing the redaction within the bounds of the database may reduce data governance issues, as the sensitive data does not necessarily need to be exported to perform the redaction and thus, does not need additional control procedures.

In some embodiments of the present disclosure, the redaction may be performed by standard database mechanisms, such as a SQL query. By using a standard SQL query, mechanisms that are native to the database (e.g., selects, joins, views, etc.) may be utilized to process and/or identify the data for redaction. In some embodiments, the redacted sensitive data may be manipulated using SQL mechanisms. In some embodiments, the redaction may be performed by exposing a UDF which returns the redacted sensitive data in a standard database format, such as in columnar form.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data. The cloud computing platform 110 may be accessed by a client device 101 (e.g., a client device). Non-limiting examples of client devices include a smart phone 101A, personal computer 101B, laptop 101C, tablet computer 101D, server computer 101E, and/or another type of device that can process data.

FIG. 1 and the other figures may use like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral.

In some embodiments, client devices 101 may access the cloud computing platform 110 over a network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI® hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the cloud computing platform 110 and one or more of the client devices 101.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution by compute nodes within elastic clusters of virtual machines, referred to herein as virtual warehouses or data warehouses. Thus, query processing 130 may include one or more virtual warehouses 131 having one or more compute nodes 132, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse 131 that expands, contracts, or shuts down according to the user's needs. Expanding a virtual warehouse 131 involves generating one or more compute nodes 132 to the virtual warehouse 131. Contracting a virtual warehouse 131 involves removing one or more compute nodes 132 from the virtual warehouse 131. More compute nodes 132 may lead to faster compute times. For example, a data load which takes fifteen hours on a system with four nodes might take only two hours with thirty-two nodes.

Cloud services 120 may be a collection of services (e.g., computer instruction executing on a processing device) that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, an authentication engine 121, an infrastructure manager 122, an optimizer 123, an exchange manager 124, a security engine 125, and/or a metadata storage 126.

In one embodiment, the cloud computing service 112 can perform a redaction operation on contents of the data in a data set of the cloud computing platform 110. In some embodiments, the redaction operation may include executing a machine learning operation to automatically recognize sensitive data within the data storage 140. In some embodiments, the redaction operation may be performed responsive to a command from a client device 101 of the cloud computing service 112, such as via a SQL statement. Additionally, the cloud computing service 112 may generate an output data set of the redaction operation that may contain a redacted version of the sensitive data without altering the sensitive data within the data storage 140.

Figure 2A:
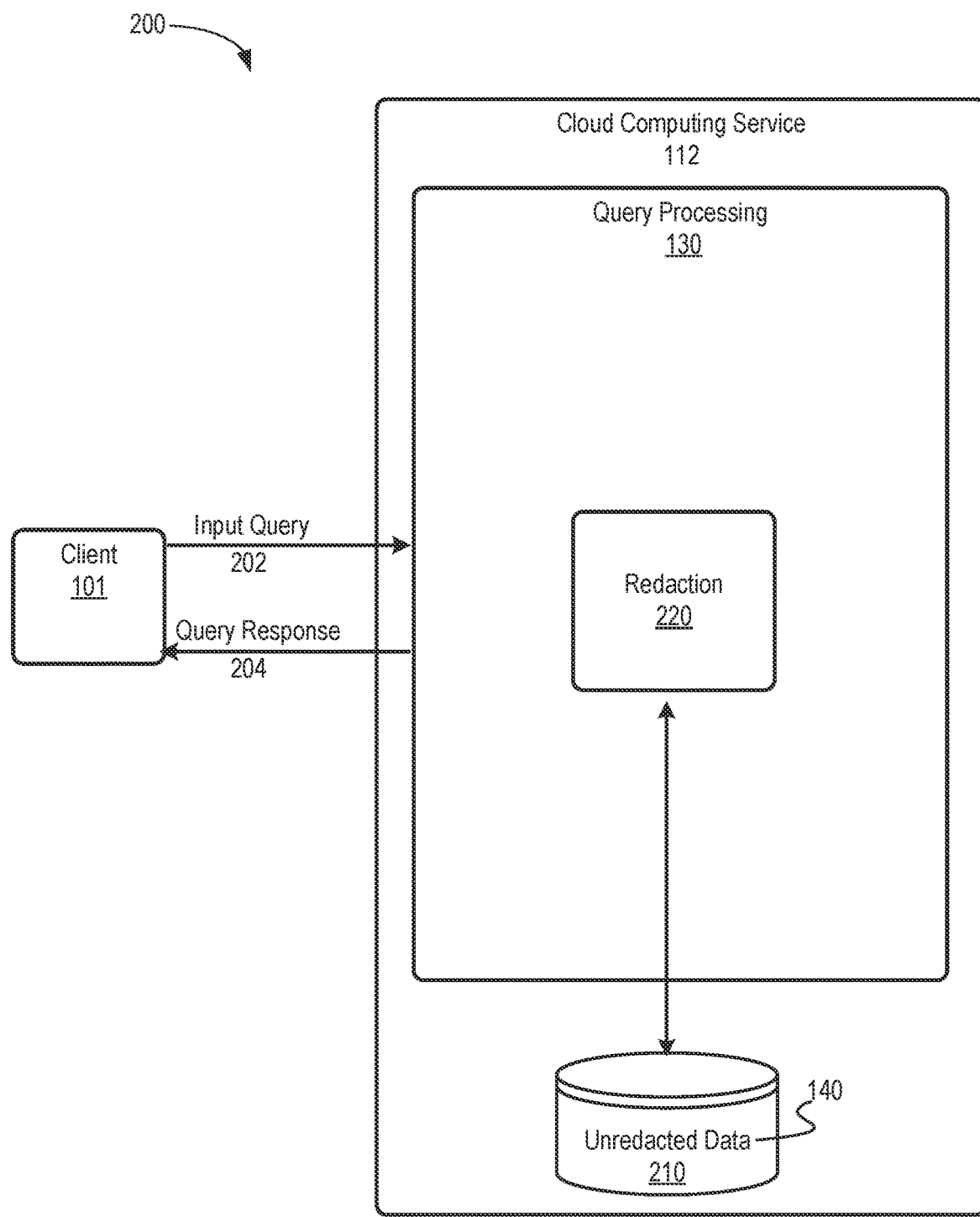
FIGS. 2A and 2B are schematic block diagrams of example embodiments of a system for performing a redaction operation on sensitive data in a database, in accordance with some embodiments of the present disclosure.
Figure 2B:
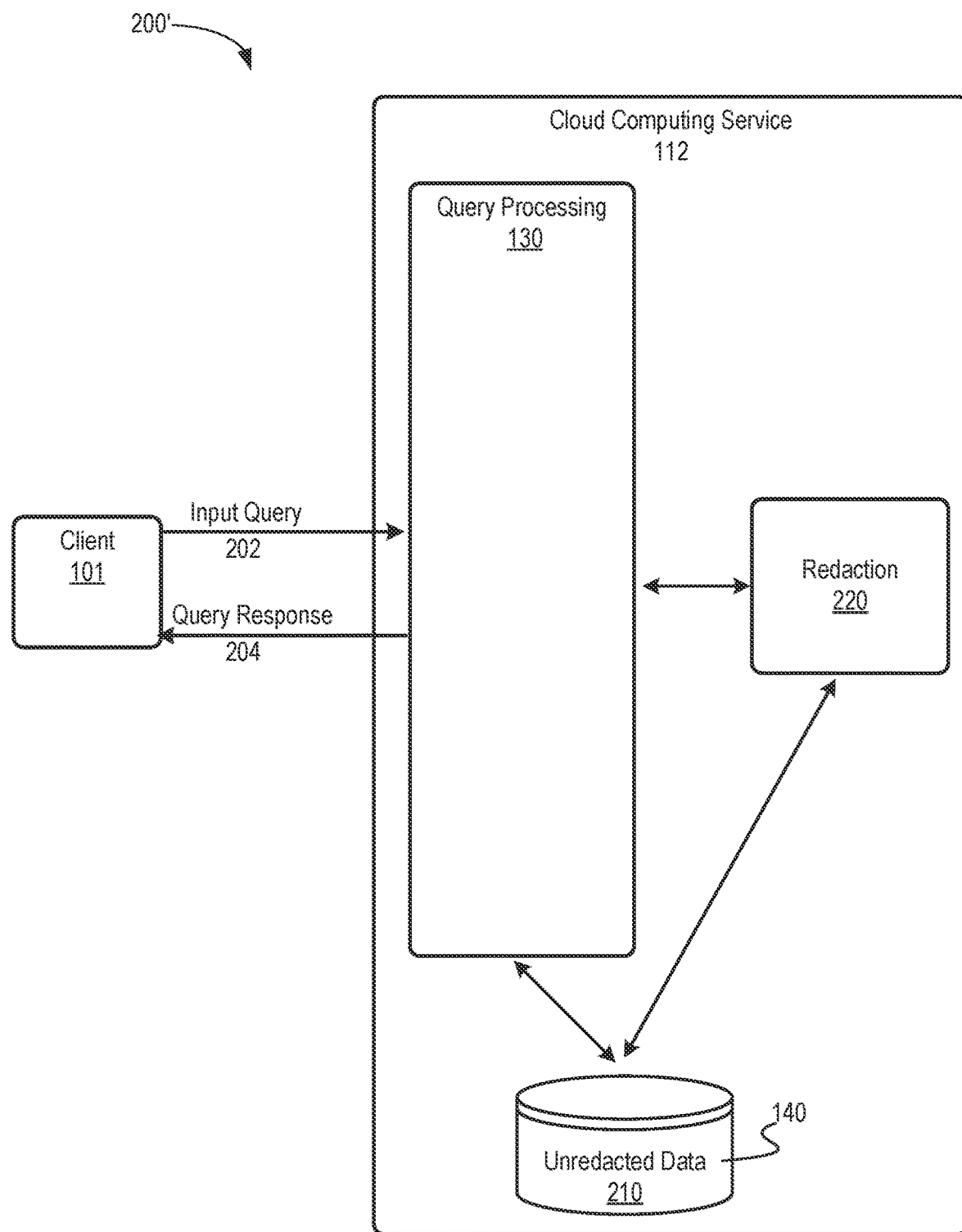

FIGS. 2A and 2B are schematic block diagrams of example embodiments of a system 200 for performing a redaction operation 220 on sensitive data in a database, in accordance with some embodiments of the present disclosure. In FIG. 2A, the system 200 includes a query processing component 130 of a cloud computing service 112 that receives an input query 202, performs a redaction operation 220 on unredacted data 210 referenced by the input query 202, and returns query response 204. The query processing 130 and/or the redaction operation 220 may be performed by a processing device of the cloud computing platform 110. For example, the redaction operation 220 may be performed by a compute node 132 of the query processing component 130 of the cloud computing platform 110.

In one embodiment, the unredacted data 210 of the input query 202 can be any type of data set including unstructured data, data stored in columns, or data that can be converted into columnar data (e.g., JavaScript Object Notation, key-value data, and/or other types of stored data). In some embodiments, the input query 202 may reference the unredacted data 210 stored in the data storage 140 of the cloud computing service 112, such as within the cloud computing platform 110 described in FIG. 1 above.

In some embodiments, the input query 202 may be a command/request provided by a client device 101. For example, the client device 101 may be a personal computer, laptop, server, tablet, smart phone, and/or another type of device that can process data and/or communicate with the cloud computing service 112. The input query 202 may provide a reference to the unredacted data 210, such as by a SQL query, and may request that the cloud computing service 112 perform the redaction operation 220 on the unredacted data 210. The results of the redaction operation 220 may be provided to the client device 101 as part of the query response 204.

FIG. 2A illustrates that the redaction operation 220 may be performed as part of the query processing infrastructure 130. However, the embodiments of the present disclosure are not limited to such an implementation. In some embodiments, the redaction operation 220 may be performed by an external service or device. For example, FIG. 2B illustrates a system 200' in which the query processing 130 invokes a call to services within the cloud computing service 112 that execute the redaction operation 220. For example, in some embodiments, the redaction operation 220 may be performed by a JAVA© environment and/or service that is invoked by the query processing 130.

When operated as an external service, the redaction operation 220 may have access to the unredacted data 210 from the data storage 140 and/or may provide the unredacted data 210 by way of the call from the query processing 130. After performing the redaction operation 220, the results may be provided to the query processing 130, which may return them as part of the query response 204.

The systems 200, 200' of FIGS. 2A and 2B may provide a mechanism by which database data, such as unredacted data 210 of data storage 140 may be processed as part of a redaction operation 220 to mask sensitive data. The redaction operation 220 may allow for the sensitive data of the unredacted data 210 to be identified and, in some embodiments, redacted and/or masked without requiring that the sensitive data be exported. Avoiding the data exportation may reduce the need for resources to protect the unredacted data 210 and may make data governance easier. In addition, the use of the redaction operation 220 within the cloud computing service 112 may allow for the redaction operation 220 to be performed utilizing standard database queries that may abstract the complexity of the redaction operation 220 from the client device 101. In addition, the redaction operation 220 may be able to provide its results in a standard format that can be easily accessed, parsed, and incorporated into other database queries. As will be discussed further herein, some embodiments of the redaction operation 220 may allow for the unredacted data 210 to be provided as SQL references to standard database tables, and the results can be similarly provided as a database table and/or view.

The redaction operation 220 can perform a plurality of different types of analyses on the unredacted data 210 referenced by the input query 202. For example, the unredacted data 210 may refer to a series of columns and/or rows of a database table. The data entries in the columns and/or rows may be provided as input data to the redaction operation 220. In some embodiments, the unredacted data 210 may include data referenced by the input query 202 of the client device 101 as well as additional data available within the cloud computing service 112. In some embodiments, the redaction operation 220 may analyze the unredacted data 210 to identify locations of sensitive data within the unredacted data. In some embodiments, the redaction operation 220 may analyze the unredacted data 210 to identify particular categories of sensitive data within the unredacted data (e.g., a type of the sensitive data). In some embodiments, the redaction operation 220 may identify a particular piece of data of the unredacted data 210 as sensitive data response to determining that a probability that the data is sensitive data exceeds a particular threshold, where the threshold may be provided by the input query 202 or may be an internally defined threshold. In some embodiments, the redaction operation 220 may utilize machine learning to identify the sensitive data in the unredacted data 210, and the machine learning operation may determine the probability that the analyzed data is sensitive data.

Figure 3:
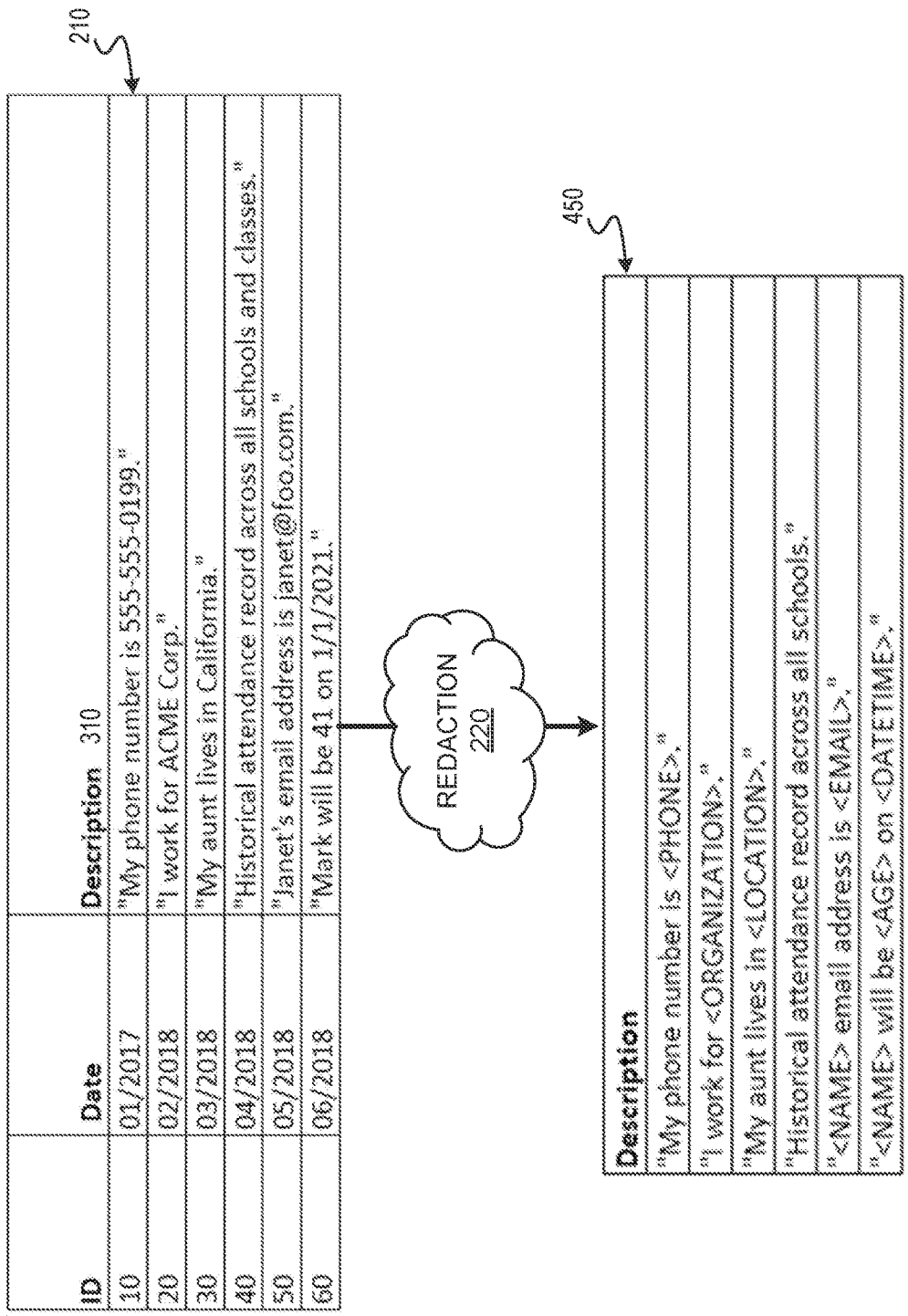
FIG. 3 is an example of unredacted data and the resulting output data that may be generated by a redaction of sensitive information performed by the redaction operation, in accordance with some embodiments of the present disclosure.

FIG. 3 is an example of unredacted data 210 and the resulting output data 450 (also referred to herein as "redacted data") that may be generated by a redaction of sensitive data within the unredacted data 210 performed by the redaction operation 220, in accordance with some embodiments of the present disclosure. Referring to FIGS. 2A, 2B, and 3, embodiments of the present disclosure may provide a reference to unredacted data 210 as part of an input query 202. The input query 202 may provide a reference to the unredacted data 210 within the cloud computing service 112. For example, the input query 202 may be provided as a SQL statement that includes a reference to one or more rows/columns of a database that contains the unredacted data 210 (e.g., in data storage 140).

In FIG. 3, the unredacted data 210 includes, for example, a description column 310. The description column may include sensitive data. For example, the various rows of the description column may include data such as a name, a location, a company, etc.

The unredacted data 210 may be provided to redaction operation 220. The redaction operation 220 may generate output data 450. The output data 450 may include a modified version of the unredacted data 210 that obscures, replaces, or removes the sensitive data of the unredacted data 210. For example, referring to FIG. 3, the output data 450 may include the data from the description column 310 with a modification that replaces the sensitive data with another identifier. For example, in the first row of the table of FIG. 3, the string "My phone number is 555-555-0199" of the unredacted data 210 has been replaced with the string "My phone number is <PHONE>" based on a determination that the phone number "555-555-0199" is sensitive data. As another example, the string "I work for ACME Corp" of the unredacted data 210 has been replaced with the string "I work for <COMPANY>" based on a determination that the company "ACME Corp" is sensitive data. FIG. 3 illustrates other examples of recognizing, and redacting, sensitive data including a location, and email address, and a name. Not all unredacted data 210 may contain sensitive data. For example, the fourth row of the unredacted data 210 includes the string "Historical attendance record across all schools" which may be determined to not contain sensitive data.

According to some embodiments, the redaction operation 220 may perform an automatic analysis of the unredacted data 210 to determine which portions of the unredacted data 210 contain sensitive data. In some embodiments, the redaction operation 220 may be performed according to computer instructions that are configured to automatically detect and classify types of sensitive data. In some embodiments, the redaction operation 220 may be performed by machine learning algorithms. For example, the redaction operation 220 may be performed according to a trained machine learning model that is configured to identify sensitive data from data strings.

In some embodiments, for each element of sensitive data identified by the redaction operation 220, a score and/or probability may be provided that indicates the likelihood that the identified data is sensitive data. For example, referring to FIG. 3, the redaction operation 220 may determine that the string "41" within the string "Mark will be 41 on 1/1/2021" is an age. The redaction operation 220 may also indicate a probability (e.g., 55%, as one example, or "medium" probability as another example) that "41" is an age, and therefore sensitive data that should be masked/redacted in the output data 450. The probability associated with the determination of a particular piece of data as sensitive data will be described further herein.

The format of the output data 450 provided in FIG. 4 is merely an example. It will be understood that other formats, as well as other output values, are possible without deviating from the scope of the present disclosure.

Still referring to FIGS. 2A, 2B, and 3, the redaction operation 220 may be executed within the cloud computing service 112 by accessing one or more sets of computer instructions. Examples of software packages that can perform detection of sensitive data include packages that can perform natural language processing, such as the APACHE OpenNLP package. In some embodiments, extensions may be provided that allow access to such packages (e.g., the APACHE OpenNLP package) from within UDF functions.

The redaction operation 220 may be configured to detect a number of different types of sensitive data. In other words, the redaction operation 220 may be able to detect both that a given element of unredacted data contains sensitive as well as what type of sensitive data it is. A non-exhaustive list of types of sensitive data that may be detected by the redaction operation 220 is included below in Table 1.

TABLE 1

| Sensitive Data Type | Explanation |
| --- | --- |
| NAME | Name of a person |
| ORGANIZATION | Company, group, government body, and/or other organization |
| LOCATION | Address or other geographic location |
| EMAIL | Email address |
| URL | URL to website or other network resource |
| IP_ADDRESS | Network IP address |
| DATETIME | Date and/or time of day |
| AGE | All components of age, spans of age, and any age references |

TABLE 1-continued

| Sensitive Data Type | Explanation |
| --- | --- |
| CREDIT_CARD | Credit card/debit card number |
| PHONE | Phone number |
| FAX | Fax number |
| SSN | US Social Security Number |
| DRIVER_LICENSE | Driver license number |
| PASSPORT | Passport number |
| ID | Other types of identifiers including but not limited to: Medical Record number Health Plan number Vehicle/Device unique identifiers |
| PROFESSION | Job, Job title, or other indicator of a profession/employment |
| CLOUD_CREDENTIALS | Credential and/or secrets from major cloud providers e.g. AWS_SECRET_KEY |

The items listed in Table 1 are merely examples, and more or fewer types of sensitive data may be detected without deviating from the scope of the present disclosure. For example, the category SSN may be less useful for non-US residents. However, other types of country-specific data may be included as a sensitive data type, such as the Social Insurance Number in Canada, the identification number from the Resident Identity Card in China, the National Insurance number of the United Kingdom, or the like.

As discussed herein, in some embodiments, access to the redaction operation 220 may be performed utilizing standard database operations and/or infrastructure. One example of such a database operation is a UDF. A UDF is a programmatically defined object that provides a mechanism for extending the functionality of the database server by adding a function that can be evaluated in standard query language (usually SQL) statements. When referenced (or "called"), a UDF is configured to execute a query that retrieves data from one or more underlying tables, or executes a procedure to generate data. The generated data may be returned from the UDF call and may provide access to the retrieved data in a similar manner as a database table.

In some embodiments, access to the redaction operation 220 may be provided as a UDF. For example, a UDF of the following format may be provided:

DETECT_PII(<column>, <probability>, <types>);

The UDF may be accessed via a database query (e.g., input query 202 of FIGS. 2A and 2B) to provide access to the redaction operation 220 according to the input values of the UDF.

In the above example, the input value <column> refers to a column of the database which is to be accessed by the redaction operation 220 to redact the sensitive data. For example, referring to the example provided in FIG. 3, the <column> value might refer to the "description" column 310 of the unredacted data 210 so as to generate the output data 450 of FIG. 3. In some embodiments, the <column> value may refer to a column of a table of a database of the cloud computing service 112 (e.g., within data storage 140).

The input value <probability> may determine what level of confidence (e.g., a minimum level) will be used for the redaction operation 220. For example, the probability input may be specified as 0.7 (or 70%) which indicates that only those elements identified as having a 70% (or greater) probability of being sensitive data should be redacted and identified in an output data 450 as including sensitive data. In some embodiments, the probability input may be specified in another format (e.g., "high," "medium," "low") that may be appropriately interpreted by the redaction operation 220. Data determined by the redaction operation 220 as having a lower probability than the specified <probability> value may be ignored and/or left unredacted in the output data 450.

The input value <types> may instruct the redaction operation 220 to only identify sensitive data of a particular type or types. The input value <types> may be provided, for example, as an array of data types such as those described herein in Table 1. For example, the input value type may be specified as "CREDIT_CARD" (or other similar value) which indicates that only those elements identified as being associated with a credit card/debit card number are identified as sensitive data and/or redacted in the output data 450. As another example, the types may be specified as ["CREDIT_CARD", "SSN"] (e.g., as members of an array or other data structure), which indicates that only those elements identified as being associated with a credit card/debit card number or a US Social Security Number are identified. The data types input value may work in conjunction with the probability input value in that sensitive data shall be identified that has at least the provided level of confidence (probability) of being of the provided input type.

In some embodiments, one or more of the inputs may be optional. For example, if a user does not specify a probability level, then a default value may be selected (e.g., 0.8/80% probability). If a user does not specify a type of sensitive data, then a default value may be to select all known sensitive data types.

The UDF may return one or more data values depending on the amount of sensitive data identified in the unredacted data 210. In some embodiments, the UDF may return a variant data type that may include a variable array of the identified sensitive data. FIGS. 4A to 4D are examples of code structures that may be utilized for return values of a redaction operation 220, in accordance with some embodiments of the present disclosure. It will be understood that the examples of FIGS. 4A to 4D are provided to show an example of one way in which the embodiments of the present disclosure may be reduced to practice, but the examples are not intended to limit the scope of the present disclosure. One of ordinary skill in the art will understand that multiple return formats may be utilized without deviating from the scope of the present disclosure.

Referring to FIG. 4A, the return value 410 of the UDF may be returned for each row of the column indicated by the UDF call (e.g., <column> discussed above). The return value 410 may include a first element that indicates whether the given column contains sensitive data. In FIG. 4A, this first element is indicated as "containsPII" having a value of TRUE or FALSE, but it will be understood that other naming conditions or data values may be used (e.g., a 0 or 1 rather than true or false).

The return value 410 may include a second element that provides a version of contents of the row in which the sensitive data has been redacted. In FIG. 4A, this second element is indicated as a text string (identified as "maskedText"), but other possibilities for providing the redacted text may be utilized without deviating from the scope of the present disclosure. In some embodiments, the redacted version of the column contents may have the sensitive data removed, obscured, or replaced. For example, the redaction operation 220 may leave the original data (e.g., unredacted data 210) unmodified and instead return the redacted data as part of the return value 410 (which may be included as part of the output data 450).

The return value 410 may include a third element that consists of an identification of each of the pieces of sensitive data that have been identified by the redaction operation 220 within a given row of the column. In FIG. 4A, this third element is indicated as a variable array of sensitive data elements 420 (identified as "piiEntities"). In some embodiments, each of the sensitive data elements 420 may include information for each piece of identified sensitive data. For example, referring to the example of FIG. 4A, the sensitive data element 420 may include an indication of the contents of the identified sensitive data ("text"), the type of the sensitive data ("type"), an offset of the sensitive data ("offset") within the data, a length of the sensitive data ("length") within the data, and/or a probability that the identified data is sensitive data ("score"). As discussed above, a sensitive data element 420 may be returned for each piece of sensitive data within a row of the column. Thus, multiple sensitive data elements 420 may be returned within the variable array of the return value 410 if multiple pieces of sensitive data are discovered within the row data. It will be understood that the structure of the sensitive data element 420 is merely an example, and other structures could be utilized without deviating from the scope of the present disclosure.

In some embodiments, the sensitive data elements 420 may be omitted. For example, in some embodiments, the redaction operation may wish to avoid providing the sensitive data as part of the return value to increase data security. In some embodiments, the sensitive data elements 420 may be selectively provided depending on an authentication/privilege level of the user accessing the UDF. For example, an administrative user or user with a higher privilege may receive the sensitive data elements 420 while a user with lower privilege may receive a return value 410 that omits the sensitive data elements 420.

It will be understood that the return value 410 illustrated in FIG. 4A could include more, or fewer, or different, values without deviating from the scope of the present disclosure. Similarly, the arrangement of the elements in FIG. 4A is an example, and, in some embodiments, the elements of the return value 410 could be arranged differently.

An example of how the example UDF (e.g., the DETECT_PII( ) UDF) may be called is included below:
SELECT DETECT_PII(column) FROM t;

The above example may result in a command according to standard SQL format that allows for the redaction of unredacted data based on a reference to a database column "column" provided as part of the SELECT statement. The "column" value specified to the UDF may refer to a named column within columnar data of a database (such as in data storage 140). It is noted, that in the above example, a probability value is omitted, but may be present in some embodiments.

In the above example, only the UDF is called, but it will be understood that other combinations of data may be returned, as in the following example:
SELECT
 description,
 DETECT_PII(description, "medium") AS pii
FROM t;

In the above example, the values of the "description" column may also be returned. The above example also illustrates the calling of the UDF utilizing a probability of "medium" probability as an example of a non-numeric probability/score. For example, probability levels such as "low," "medium", and "high" might be assigned to particular probability numbers and/or ranges to allow for easier access to the redaction operation 220. In such an example, the redaction operation 220 may return those data elements of the unredacted data 210 that have a medium or higher probability of being sensitive data. In some embodiments, "medium" might be replaced by, for example, 0.8 in the call to the UDF.

As another example, a particular type of sensitive data may be isolated in the return values, as in the following example:
SELECT
   description,
   DETECT_PII(description, 0.87, "NAME") AS pii
FROM t;
In the above example, the values of the "description" column may also be returned as before. The above example also illustrates the calling of the UDF utilizing a numeric probability of 0.87. In addition, the above example illustrates that the redaction operation 220 may be limited to sensitive data of a particular type (NAME, or names of a person). In such an example, the redaction operation 220 may return those data elements of the unredacted data 210 that have been identified as having at least a 0.87 (87%) probability of being a name of a person, and other types of sensitive data elements may be ignored.

FIGS. 4B to 4D are examples of return value 410 for an output of a call to the redaction UDF (e.g., DETECT_PII) for various ones of the rows of the example unredacted data 210 of FIG. 3. FIGS. 4B to 4D illustrate examples for particular rows in the example unredacted data 210 of FIG. 3, but it will be understood that the UDF may be called for the entire column, and the UDF may provide a return value 410 for each of the rows as a result of a single UDF call that references the column.

FIG. 4B illustrates an example return value 410A that may be returned from the redaction operation 220 for the first row of the example unredacted data 210 of FIG. 3. Referring to FIG. 4B, the return value 410A indicates that sensitive data was detected ("containsPII" equals TRUE) and that the redacted text ("maskedText") is "My phone number is <PHONE>." As shown, the redacted text has replaced the text "555-555-0199" of the example unredacted data 210 with redacted text "<PHONE>" responsive to determining (e.g., as a result of a machine learning operation performed by the redaction operation 220) that the text "555-555-0199" has a probability of being sensitive data that exceeds a particular threshold (e.g., a probability that exceeds a score provided as part of the UDF call or that exceeds a defined threshold within the redaction operation 220).

Still referring to FIG. 4B, the example return value 410A may include an example array of one sensitive data element 420A that identifies the sensitive data as the text "555-555-0199" having a length of 12 characters that are offset 19 characters into the string. The example return value 410A further indicates that the redaction operation 220 identified this text as having an 80% (0.8) probability of being sensitive data of type PHONE (e.g., a phone number).

FIG. 4C illustrates an example return value 410B that may be returned from the redaction operation 220 for the fourth row of the example unredacted data 210 of FIG. 3. Referring to FIG. 4C, the return value 410B indicates that no sensitive data was detected ("containsPII" equals FALSE) and that the redacted text ("maskedText") is the same as the original text (e.g., "Historical attendance record across all schools.") Because the redaction operation 220 has not detected any sensitive data, the array of sensitive data elements (e.g., "piiEntities") is empty.

FIG. 4D illustrates an example return value 410C that may be returned from the redaction operation 220 for the fifth row of the example unredacted data 210 of FIG. 3. FIG. 4D illustrates an example in which more than one element of sensitive data is detected in a particular row.

Referring to FIG. 4C, the return value 410C indicates that sensitive data was detected ("containsPII" equals TRUE) and that the redacted text ("maskedText") is "<Name> email address is <Email>." As shown, the redacted text has replaced the text "Janet's" of the example input unredacted data 210 with redacted text "<NAME>" and the text "janet@foo.com" of the example input unredacted data 210 with redacted text "<EMAIL>" responsive to determining (e.g., as a result of a machine learning operation performed by the redaction operation 220) that the text "Janet's" and "janet@foo.com" each have a probability of being sensitive data that exceeds a particular threshold (e.g., a probability that exceeds a score provided as part of the UDF call or that exceeds a defined threshold within the redaction operation 220).

Still referring to FIG. 4C, the example return value 410C may include an example array of two sensitive data elements 420C1 and 420C2. The first sensitive data element 420C1 identifies a first element of sensitive data as the text "Janet's" having a length of 7 characters that are offset 0 characters into the string. The example first sensitive data element 420C1 further indicates that the redaction operation 220 identified this text as having an 0.724 probability of being sensitive data of type NAME (e.g., a name). The second sensitive data element 420C2 identifies a second element of sensitive data as the text "janet@foo.com" having a length of 13 characters that are offset 25 characters into the string. The example second sensitive data element 410C2 further indicates that the redaction operation 220 identified this text as having an 0.95 probability of being sensitive data of type EMAIL (e.g., an email address).

Thus, the redaction operation 220 may be performed on data within the database without exporting the data (e.g., in situ analysis). Moreover, the complexity of the redaction operation 220 may be abstracted from the user utilizing standard SQL operations, while providing a convenient way to manipulate the resulting redacted text that utilizes known techniques for SQL manipulation.

Figure 5:
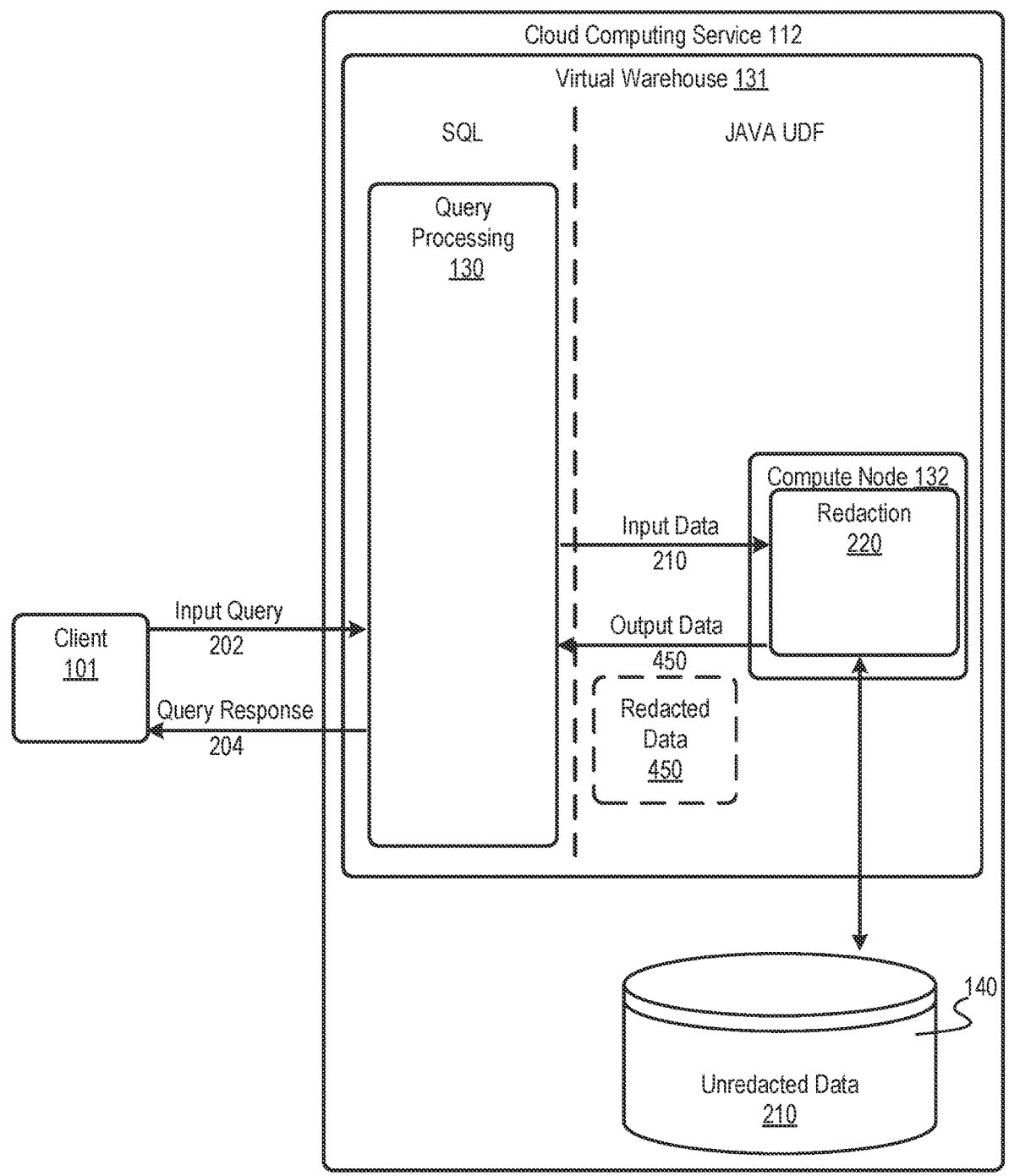
FIG. 5 is a schematic block diagram of an example embodiment of performing a redaction operation on an unredacted data set utilizing a user-defined function (UDF), in accordance with some embodiments of the present disclosure.

FIG. 5 is a schematic block diagram of an example embodiment of performing a redaction operation 220 on an unredacted data 210 utilizing a UDF, in accordance with some embodiments of the present disclosure. As FIG. 5 contains elements that are the same or similar as discussed herein with respect to FIGS. 2A and 2B, a duplicate description thereof will be omitted for brevity.

Referring to FIG. 5, embodiments of the present disclosure may be implemented as part of a virtual warehouse 131 of the query processing component 130 (see FIG. 1). The query processing 130 for some embodiments of the present disclosure may be implemented in response to the input query 202 from client device 101. The input query 202 may be, for example, a SQL query or other SQL construct, such as the SQL query examples described herein.

As part of implementing the SQL query, the query processing 130 may execute a JAVA UDF. The JAVA UDF may be a UDF implemented using the JAVA language. In some embodiments, the JAVA UDF may be executed by one of the compute nodes 132 of the virtual warehouse 131. The SQL query may provide unredacted data 210 (or a reference to unredacted data 210 within data storage 140) to the JAVA UDF.

The JAVA UDF may execute the redaction operation 220. For example, as described herein, the JAVA UDF may provide the unredacted data 210 (or a reference to the unredacted data 210) to a set of instructions configured to analyze text and determine if the text contains sensitive data. For example, in some embodiments, the redaction operation 220 may perform a machine learning operation or other type of natural language processing on the unredacted data 210 to recognize the sensitive data. The redaction operation 220 may generate output data 450 (also referred to as redacted data 450) in response to the redaction operation 220. In some embodiments, the redacted data 450 may include a redacted version of the unredacted data 210 and/or indications of locations within the unredacted data 210 that the sensitive data was found. In some embodiments, the redacted data 450 may include a probability score of each of the identified pieces of sensitive data that indicates a probability that the identified piece of sensitive data is, in fact, sensitive data.

The redacted data 450 may be processed by the query processing 130 and be provided to the client device 101 via the query response 204. In some embodiments, the query response 204 may provide the redacted data 450 of the redaction operation 220 to the client device 101 in a standard database format (e.g., as tabular data capable of being accessed and/or manipulated by SQL statements).

Though FIG. 5 illustrates the use of a JAVA UDF, it will be understood that other types of UDFs may be utilized without deviating from the present disclosure. For example, in some embodiments, the JAVA UDF may be replaced with a UDF implemented in another language, such as PYTHON as merely one example.

Though FIG. 5 illustrates the use of a UDF, it will be understood that other mechanisms within the cloud computing service 112 may be utilized without deviating from the present disclosure. For example, in some embodiments, access to the redaction operation 220 may be provided by a stored procedure or other type of database command. The stored procedure may access input data (e.g., either passed to or referenced by the call to the stored procedure). Other mechanisms to access the redaction operation 220 within the scope of the present disclosure will be recognized by those of ordinary skill in the art.

Figure 6:
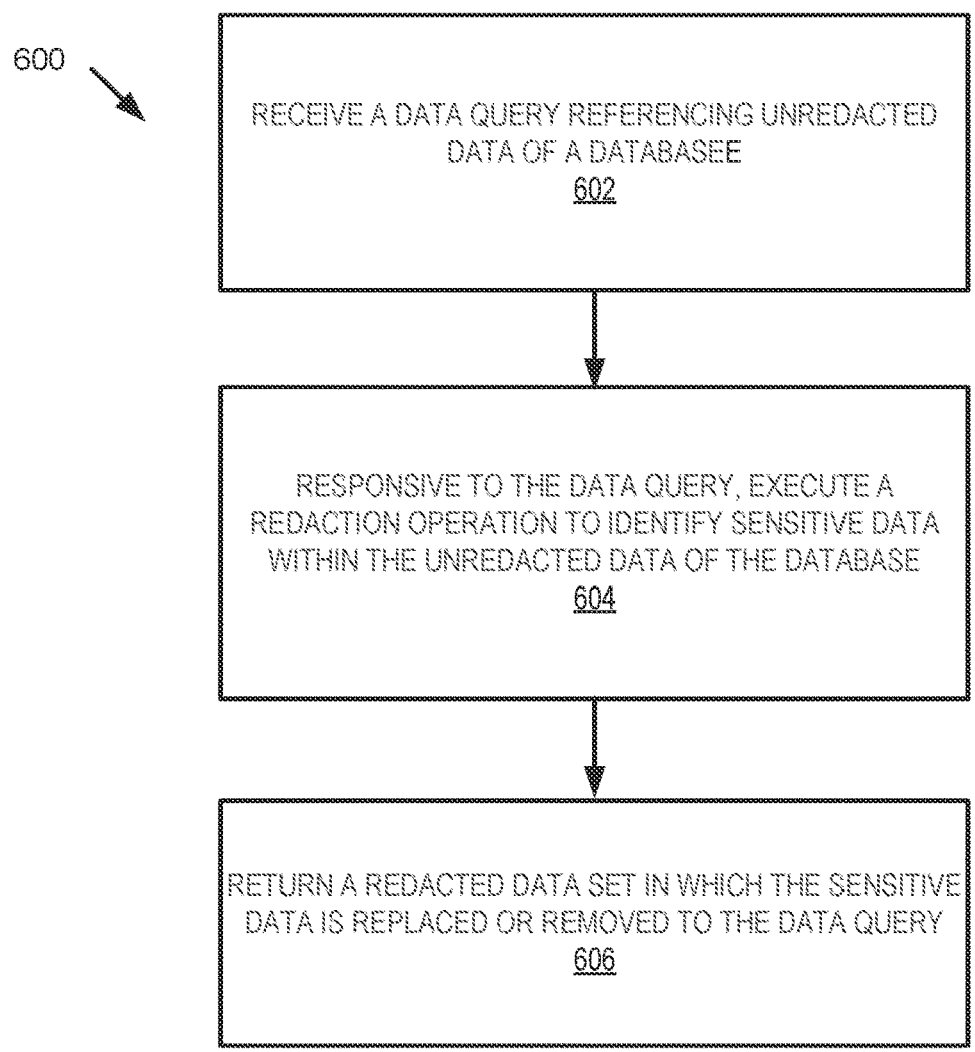
FIG. 6 is a flow diagram of one embodiment of a method to perform a redaction operation on a data set, in accordance with some embodiments of the present disclosure.

FIG. 6 is a flow diagram of one embodiment of a method 600 to perform a redaction operation 220 on a data set, in accordance with some embodiments of the present disclosure. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing component 130. Method 600 may begin at step 602, where the processing logic receives a data query referencing unredacted data of a database. In some embodiments, the unredacted data is columnar data or can be extracted or transformed into columnar data. In some embodiments, the data query may incorporate standard SQL elements. For example, in some embodiments, the data query may incorporate a UDF and/or include a SQL select statement referencing data (e.g., columnar data) of the database.

At step 604, processing logic may, responsive to the data query, execute a redaction operation to identify sensitive data within the unredacted data of the database. In some embodiments, the redaction operation may be a machine learning operation and/or other form of natural language processing. The redaction operation may reference the unredacted data provided by the data query received at step 602. In some embodiments, the redaction operation may be performed via a call to a JAVA UDF from a SQL query. In some embodiments, the JAVA UDF may return the redacted data to the SQL query, which may organize the redacted data into a format so that it may be accessed programmatically (e.g., as an array or a table). In some embodiments, the redaction operation may be configured to identify particular data within the unredacted data as sensitive data responsive to determining that the probability the particular data is sensitive data exceeds a defined threshold. In some embodiments, the threshold for the probability used to determine the sensitive data may be provided as part of the data query.

At step 606, the processing logic returns a redacted data set in which the sensitive data is replaced or removed to the data query. In some embodiments, the redacted data set may be provided in a format that is or contains standard SQL elements. For example, the redacted data set may be provided as data that can be accessed via SQL queries (e.g., a SELECT SQL statement). In some embodiments, the redacted data set indicates a location within the unredacted data set at which the sensitive data is located. In some embodiments, the redacted data set may include a probability value for each element of identified sensitive data within the unredacted data.

As described herein, a cloud services platform can provide access to a redaction capability for sensitive data by utilizing modifications accessed by standard database mechanisms, such as SQL commands. The redaction capability may allow for the identification of sensitive data to be performed in situ within the database without requiring a data export and through standard database mechanisms.

Figure 7:
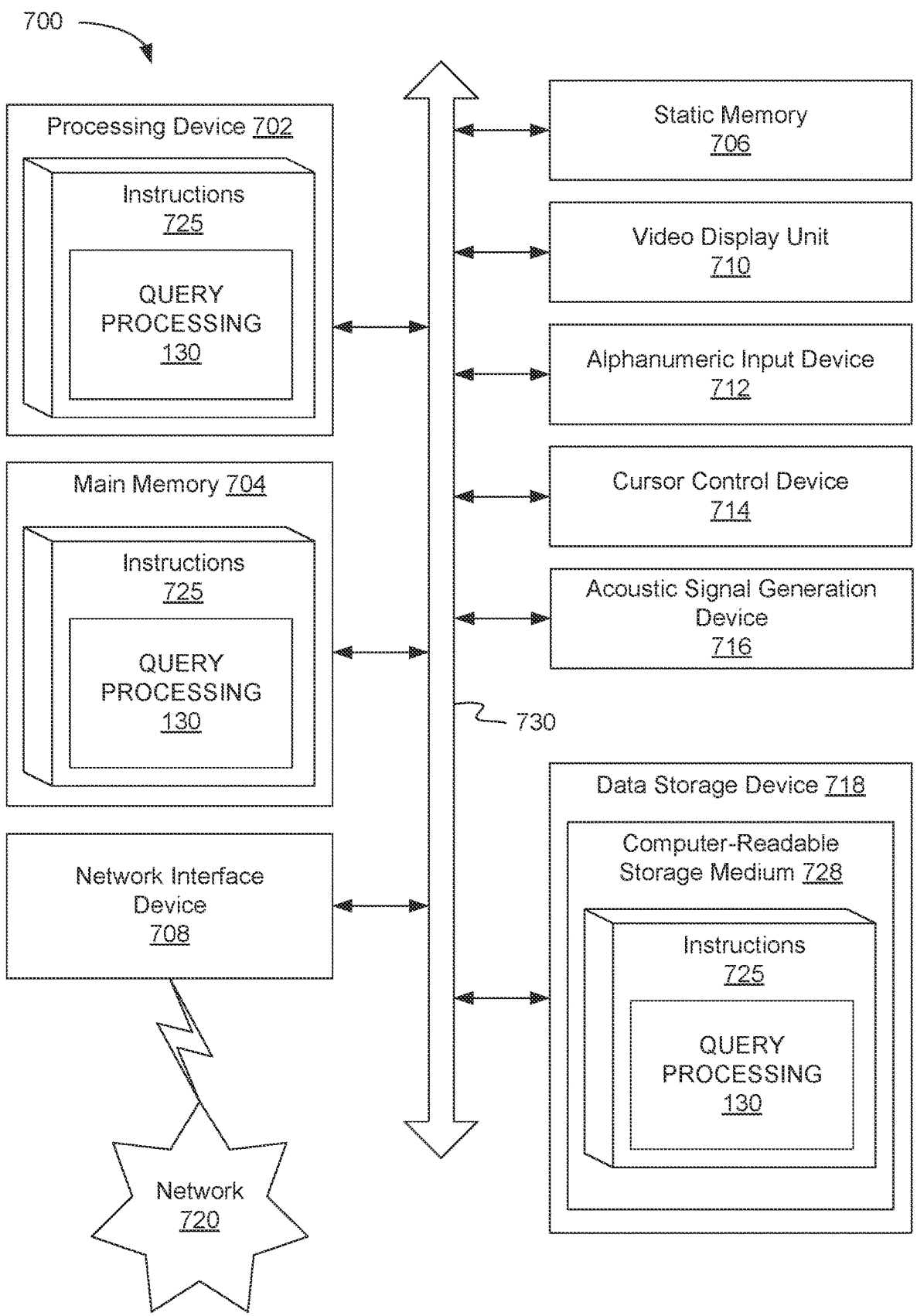
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 1406 (e.g., flash memory) and a data storage device 718, which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein. In one embodiment, processing device 702 represents a processing device of cloud computing platform 70 of FIG. 1.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725, such as instructions for executing the query processing component 130, e.g., instructions for carrying out the operations described herein, in accordance with one or more aspects of the present disclosure. Query processing instructions 130 may also reside, completely or at least partially, within main memory 704 and/or within processing device 702 during execution thereof by computing device 700, the main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "executing," "selecting," "determining," "returning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a data query referencing unredacted data of a database, wherein the data query that is received comprises a value identifying a type of sensitive data to be redacted from the unredacted data;
   responsive to the data query, executing, by a processing device, a redaction operation to identify candidate sensitive data that matches the type of sensitive data to be redacted within the unredacted data of the database, wherein the redaction operation identifies one or more categories of types of sensitive data within the unredacted data; and
   returning a redacted data set in which the candidate sensitive data that is determined to exceed a probability threshold determining actual sensitive data is replaced or removed, wherein the redacted data set includes an indication of locations of the actual sensitive data found within the unredacted data, wherein the probability threshold is provided by the data query.

2. The method of claim 1, wherein the data query comprises a SQL query.

3. The method of claim 1, wherein the data query comprises a user-defined function (UDF), and the value identifying the type of sensitive data to be redacted from the unredacted data is an input value of the UDF.

4. The method of claim 1, wherein the redacted data set that is returned comprises a value indicating an offset within a data value of the unredacted data set at which the sensitive data is located.

5. The method of claim 1, wherein the value identifying the type of sensitive data to be redacted from the unredacted data comprises at least one of a name of a person, a name of an organization, an indicator of a geographic location, an email address, a uniform resource locator (URL) to a network resource, a network internet protocol (IP) address, a date, an age, a credit card number, a phone number, a fax number, a United States social security number, a license number, a passport number, an indicator of employment, a medical record number, or a credential associated with a cloud provider.

6. The method of claim 1, wherein the value identifying the type of sensitive data is a plurality of values identifying a plurality of types of sensitive data.

7. The method of claim 6, wherein the redacted data set that is returned comprises a value indicating a respective type of the plurality of types for elements of the sensitive data that are replaced or removed within the redacted data set.

8. A system comprising:
   a memory; and
   a processing device, operatively coupled to the memory, to:
   receive a data query referencing unredacted data of a database, wherein the data query that is received comprises a value identifying a type of sensitive data to be redacted from the unredacted data;
   responsive to the data query, execute a redaction operation to identify candidate sensitive data that matches the type of sensitive data to be redacted within the unredacted data of the database, wherein the redaction operation identifies one or more categories of types of sensitive data within the unredacted data; and return a redacted data set in which the candidate sensitive data that is determined to exceed a probability threshold determining actual sensitive data is replaced or removed, wherein the redacted data set includes an indication of locations of the actual sensitive data found within the unredacted data, wherein the probability threshold is provided by the data query.

9. The system of claim 8, wherein the data query comprises a SQL query.

10. The system of claim 8, wherein the data query comprises a user-defined function (UDF), and the value identifying the type of sensitive data to be redacted from the unredacted data is an input value of the UDF.

11. The system of claim 8, wherein the redacted data set that is returned comprises a value indicating an offset within a data value of the unredacted data set at which the sensitive data is located.

12. The system of claim 8, wherein the value identifying the type of sensitive data to be redacted from the unredacted data comprises at least one of a name of a person, a name of an organization, an indicator of a geographic location, an email address, a uniform resource locator (URL) to a network resource, a network internet protocol (IP) address, a date, an age, a credit card number, a phone number, a fax number, a United States social security number, a license number, a passport number, an indicator of employment, a medical record number, or a credential associated with a cloud provider.

13. The system of claim 8, wherein the value identifying the type of sensitive data is a plurality of values identifying a plurality of types of sensitive data.

14. The system of claim 13, wherein the redacted data set that is returned comprises a value indicating a respective type of the plurality of types for elements of the sensitive data that are replaced or removed within the redacted data set.

15. A non-transitory computer-readable storage medium including instructions that, when executed by a processing device, cause the processing device to:
receive a data query referencing unredacted data of a database, wherein the data query that is received comprises a value identifying a type of sensitive data to be redacted from the unredacted data;
responsive to the data query, execute, by the processing device, a redaction operation to identify candidate sensitive data that matches the type of sensitive data to be redacted within the unredacted data of the database, wherein the redaction operation identifies one or more categories of types of sensitive data within the unredacted data; and
return a redacted data set in which the candidate sensitive data that is determined to exceed a probability threshold determining actual sensitive data is replaced or removed, wherein the redacted data set includes an indication of locations of the actual sensitive data found within the unredacted data, wherein the probability threshold is provided by the data query.

16. The non-transitory computer-readable storage medium of claim 15, wherein the data query comprises a user-defined function (UDF), and the value identifying the type of sensitive data to be redacted from the unredacted data is an input value of the UDF.

17. The non-transitory computer-readable storage medium of claim 15, wherein the redacted data set that is returned comprises a value indicating an offset within a data value of the unredacted data set at which the sensitive data is located.

18. The non-transitory computer-readable storage medium of claim 15, wherein the value identifying the type of sensitive data to be redacted from the unredacted data comprises at least one of a name of a person, a name of an organization, an indicator of a geographic location, an email address, a uniform resource locator (URL) to a network resource, a network internet protocol (IP) address, a date, an age, a credit card number, a phone number, a fax number, a United States social security number, a license number, a passport number, an indicator of employment, a medical record number, or a credential associated with a cloud provider.

19. The non-transitory computer-readable storage medium of claim 15, wherein the value identifying the type of sensitive data is a plurality of values identifying a plurality of types of sensitive data.

20. The non-transitory computer-readable storage medium of claim 19, wherein the redacted data set that is returned comprises a value indicating a respective type of the plurality of types for elements of the sensitive data that are replaced or removed within the redacted data set.

* * * * *